(12) United States Patent
Nakagawa

(10) Patent No.: US 8,086,175 B2
(45) Date of Patent: Dec. 27, 2011

(54) FIELD DEVICE SEARCH SYSTEM

(75) Inventor: Shinya Nakagawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 475 days.

(21) Appl. No.: 12/316,080

(22) Filed: Dec. 9, 2008

(65) Prior Publication Data

US 2009/0170544 A1 Jul. 2, 2009

(30) Foreign Application Priority Data

Dec. 10, 2007 (JP) ................................ 2007-318612

(51) Int. Cl.
*H04B 7/24* (2006.01)
*G01S 1/02* (2010.01)
(52) U.S. Cl. ...................................... 455/39; 342/357.2
(58) Field of Classification Search .................... 455/39, 455/500, 507, 517, 456; 701/207, 221; 340/539.13; 342/357.2
See application file for complete search history.

(56) References Cited

U.S. PATENT DOCUMENTS

| 4,990,892 A | 2/1991 | Guest et al. |
| 5,627,524 A | 5/1997 | Fredrickson et al. |
| 6,366,856 B1 | 4/2002 | Johnson |
| 6,542,822 B1 | 4/2003 | Froeberg |
| 7,363,137 B2 * | 4/2008 | Brant et al. ..................... 701/50 |
| 2002/0171558 A1 | 11/2002 | Bartelheim et al. |

FOREIGN PATENT DOCUMENTS

| DE | 102005060050 A1 | 6/2007 |
| JP | 2002-32166 | 1/2002 |
| JP | 2004-21877 | 1/2004 |
| JP | 2006-60696 | 3/2006 |
| WO | 98-45728 A1 | 10/1998 |
| WO | 2006016845 A1 | 2/2006 |

OTHER PUBLICATIONS

European Office Action for Application No. 08 021 120.4-1239, issued Apr. 23, 2010, English.
Extended European Search Report Dated May 27, 2009.
European Office Action issued in corresponding European Patent Application No. 08021120.4 on May 16, 2011.

* cited by examiner

*Primary Examiner* — Dean Takaoka
(74) *Attorney, Agent, or Firm* — Sughrue Mion, PLLC

(57) ABSTRACT

The field device search system is composed of a plurality of field devices having a wireless transmitting/receiving capability and an information terminal having a receiving capability to receive radio waves from a field device, wherein the information terminal includes a radio wave receiver, a CPU (arithmetic means), a display part, a memory, and member for identifying one of the plurality of field devices.

5 Claims, 5 Drawing Sheets

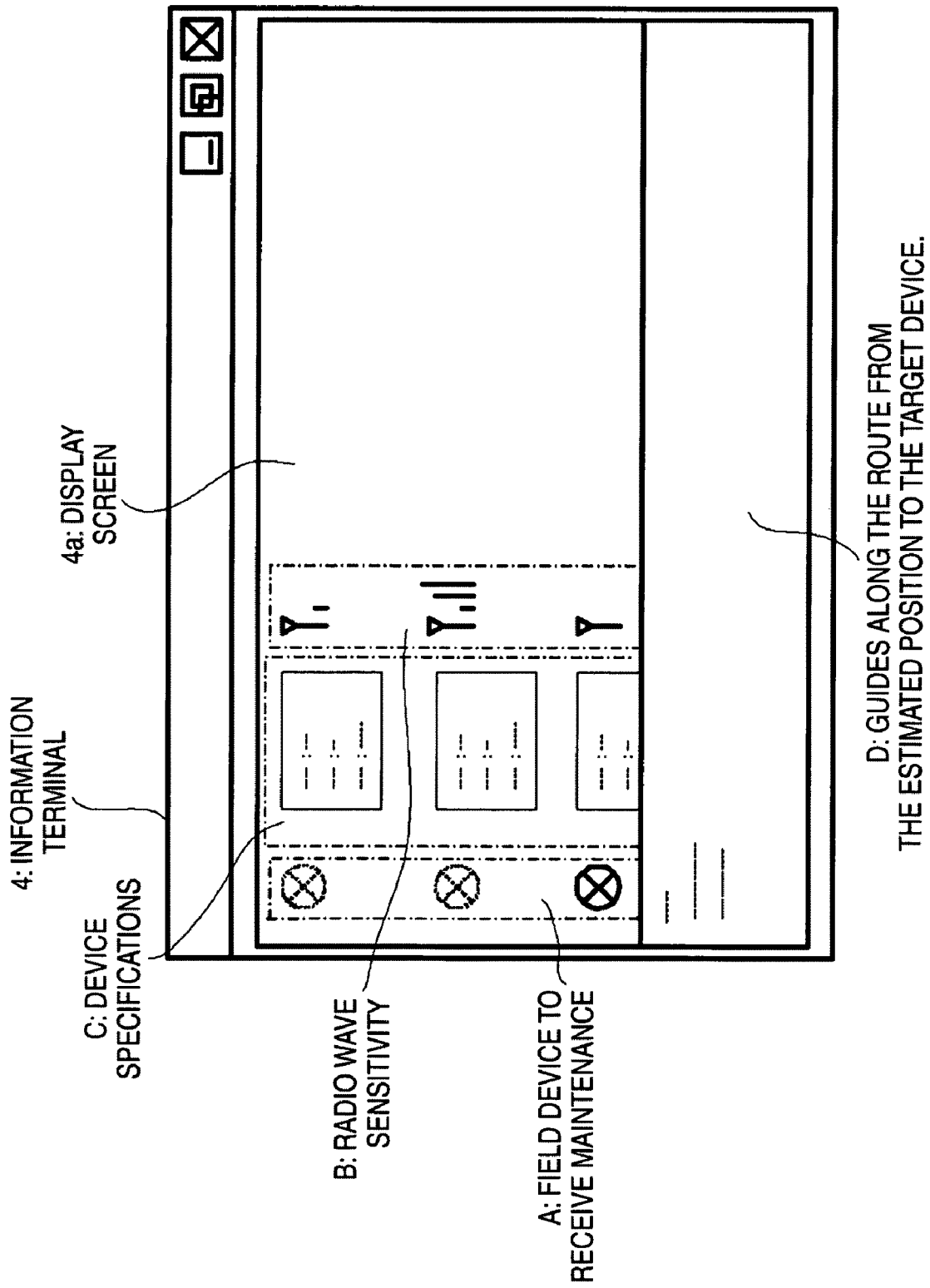

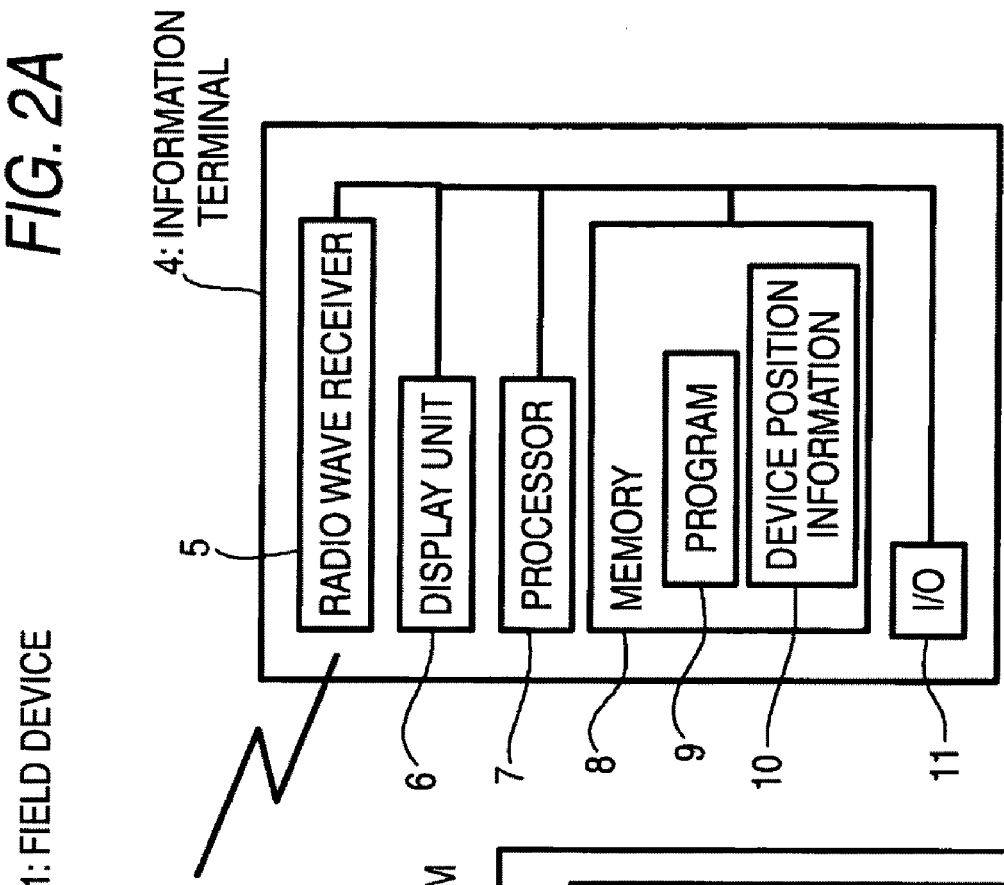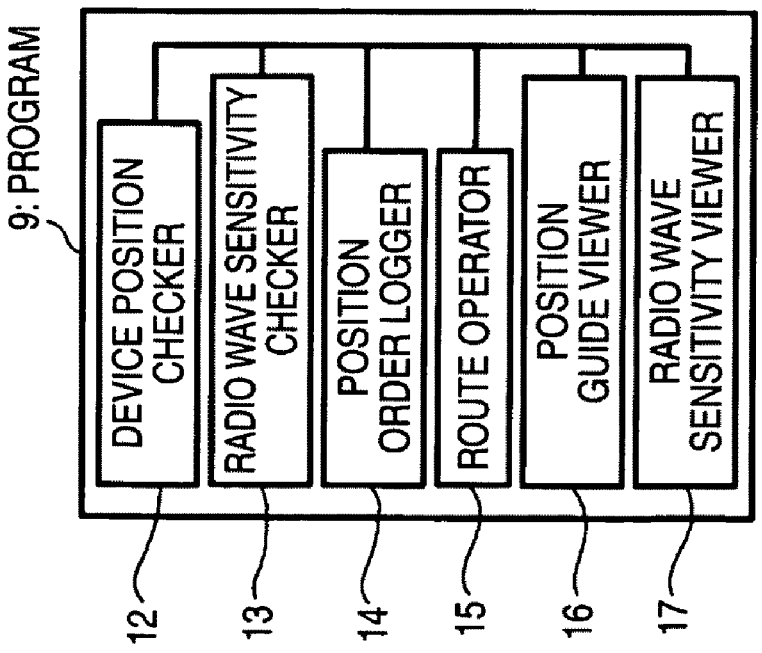

FIG. 3A | RADIO WAVES FROM DEVICES ARE RECEIVED BY THE [RADIO WAVE RECEIVER].

FIG. 3B | THE SENSITIVITIES OF THE RADIO WAVES ARE CHECKED BY A [RADIO WAVE SENSITIVITY CHECKER].

FIG. 3C | THE POSITION OF THE INFORMATION TERMINAL IS IDENTIFIED WITH THE [DEVICE POSITION CHECKER] BASED ON THE INFORMATION ON THE DEVICE FROM WHICH RADIO WAVES ARE BEING RECEIVED, RADIO WAVE SENSITIVITY AND THE [DEVICE POSITION INFORMATION] IN THE INFORMATION TERMINAL.

FIG. 3D | THE LOCUS ON WHICH THE INFORMATION TERMINAL HAS TRAVELED IS STORED BY THE [POSITION ORDER LOGGER] AND THE DIRECTION THE INFORMATION TERMINAL IS TRAVELING IS CALCULATED WITH THE [ROUTE OPERATOR] BASED ON THE STORED LOCUS.

FIG. 3E | BASED ON THE [DEVICE POSITION CHECKER] IN THE INFORMATION TERMINAL AND THE CURRENT LOCATION/DIRECTION OBTAINED, THE ROUTE TO THE DEVICE TO BE SEARCHED FOR IS CALCULATED BY USING THE [POSITION ORDER LOGGER] AND THE [ROUTE OPERATOR].

FIG. 3F | A LIST OF RADIO WAVE SENSITIVITIES OF DEVICES FROM WHICH RADIO WAVES ARE BEING RECEIVED AND ROUTE GUIDANCE TO THE TARGET DEVICE ARE DISPLAYED ON THE [DISPLAY SCREEN] IN THE INFORMATION TERMINAL WITH A [POSITION GUIDE VIEWER] AND A [RADIO WAVE SENSITIVITY VIEWER].

FIG. 5
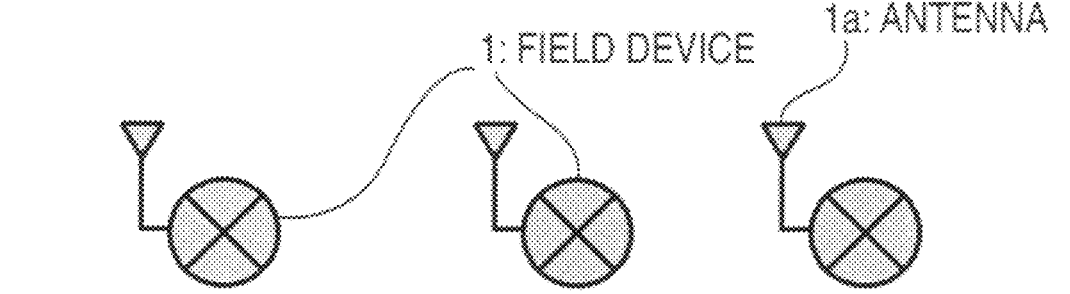
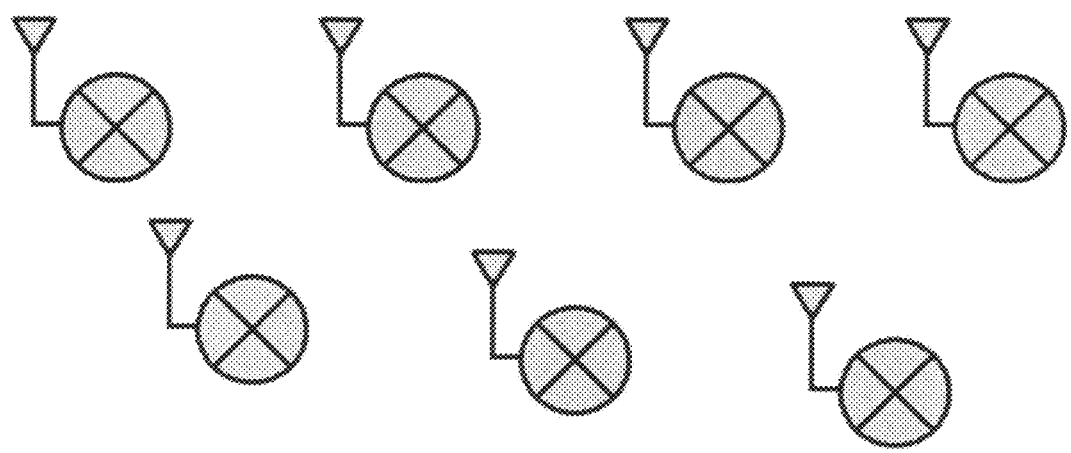

FIELD DEVICE SEARCH SYSTEM

BACKGROUND OF THE INVENTION

The present invention relates to a field device search system designed to facilitate a search for one of a plurality of field devices (such as sensors and actuators) installed over a relatively wide area of a plant (factory).

In case a target field device that needs maintenance is searched for in a plant (factory) in a maintenance process, the target field device that needs maintenance has been accessed with the help of a drawing or memory of the worker in the related art.

FIG. 5 shows the concept of field device search in the related art. As shown in FIG. 5, a worker 3 is searching for a place where a field device 1 is located and a path thereto with the help of human memory while watching a drawing 2.

As techniques in the related art concerning a field device search system, the following patent references are known.
[Patent Reference 1] JP-A-2002-032166
[Patent Reference 2] JP-A-2004-021877
[Patent Reference 3] JP-A-2006-060696

Field devices include a sensor device such as a thermometer, a pressure measuring gauge or a flowmeter for measuring and detecting a physical quantity such as temperature, pressure or flow rate and transmitting the physical quantity to a controller installed in a position remote from the measurement site and an actuator such as a valve positioner or a switch for receiving a control signal transmitted from the controller.

The above field devices are widely used on plant sites of various types of industry sectors including petrochemical industry, foods and pharmaceuticals, water supplies and sewers, and steelmaking as well as utility control systems including air-conditioning, feedwater and drainage, power feeding and security in various types of buildings such as factories and constructions.

Communications of measurement data or control signals by such field devices have been generally made via cables in the related art. In recent years, such communications have been more often performed by way of wireless communication equipment.

In the procedure for setting such field devices, it is getting commonplace for a worker carrying a portable terminal equipped with the human-machine interface (HMI) to visit a site where a field device is installed and perform predetermined setting operation on a target field device through infrared or wireless communications by using the portable terminal.

In an attempt to search for a target field device in a plant, a worker used to access the target device to receive maintenance with the help of a drawing or human memory.

The related art has the problems described below.

Search for a device using a drawing or human memory is uncertain. In particular, in a plant (factory) where piping is arranged in a complicated way and field devices are widely installed, search for a device has to rely on w worker's memory while referring to a drawing.

For example, in a factory or a plant where wirelessly communicable devices are installed, search for a device may use the strength of radio waves. In this example, in case there is a gap in the service range of radio waves from a device, no information is obtained from the device. This makes it difficult to reach the device.

SUMMARY OF THE INVENTION

An object of the invention is to provide a field device search system that reliably accesses one of the field devices installed in a plant and delivers improved work efficiency by supporting search for a device.

To attain the object, according to a first aspect of the invention, there is provided a field device search system including:
a plurality of field devices, installed in a plant, having a wireless transmitting/receiving capability, and
an information terminal having a receiving capability to receive radio waves from the plurality of field devices, wherein
the information terminal includes a radio wave receiver, a CPU (arithmetic means), a display part, a memory, and a member for identifying one of the plurality of field devices.

According to a second aspect of the invention, there is provided the field device search system according to the first aspect, wherein
the display part of the information terminal displays strength of radio waves received from the plurality of field devices and a detection result including at least a tag number of the device, estimates a current position of the information terminal, and displays a route from an estimated position to a device to be searched for.

According to a third aspect of the invention, there is provided the field device search system according to the first or second aspect, wherein
the memory stores program software operating on the information terminal and a list of information on the plurality of field devices installed in the plant.

According to a forth aspect of the invention, there is provided the field device search system according to any one of the first to third aspects, wherein
the plurality of field devices are connected to a distributed control system (DCS) via communication cables, and originate an ID signal from the information terminal or a transmitter held by a worker to the plurality of field devices.

As understood from the above, the following advantage is obtained from the first to third aspects of the invention.

The inventive field device search system is composed of a plurality of field devices having a wireless transmitting/receiving capability and an information terminal having a receiving capability to receive radio waves from a field device, characterized in that the information terminal includes a radio wave receiver, a CPU (arithmetic means), a display part, a memory, and member for identifying one of the plurality of field devices.

With The inventive field device search system, the display part of the information terminal displays the strength of radio waves received from the plurality of field devices and a detection result including at least the tag number of the device as well as estimates the current position of the information terminal and display the route from the estimated position to a device to be searched for.

The memory stores program software operating on the information terminal and a list of information on the plurality of field devices installed in the plant. It is thus possible to provide a field device search system with improved work efficiency by reliably accessing one of the field devices installed in a plant and search for a target device.

According to the forth aspect, the plurality of field devices are connected to a distributed control system (DCS) via communication cables and are designed to originate an ID signal to the plurality of field devices from the information terminal or a transmitter held by a worker. This makes it possible to identify the position of the worker and monitor the work by way of the DCS based on an ID and the information on the position of a device arranged in a position information management system.

BRIEF DESCRIPTION OF THE DRAWINGS

FIG. 1 is an explanatory drawing that shows an exemplary embodiment of an information terminal used in a field device search system according to the invention.

FIGS. 2(a) and 2(b) are block diagrams of the information terminal.

FIG. 3 is a flowchart of the operation of the information terminal.

FIG. 5 shows an example of field device search in the related art.

DETAILED DESCRIPTION OF THE PREFERRED EMBODIMENTS

Figure 4:
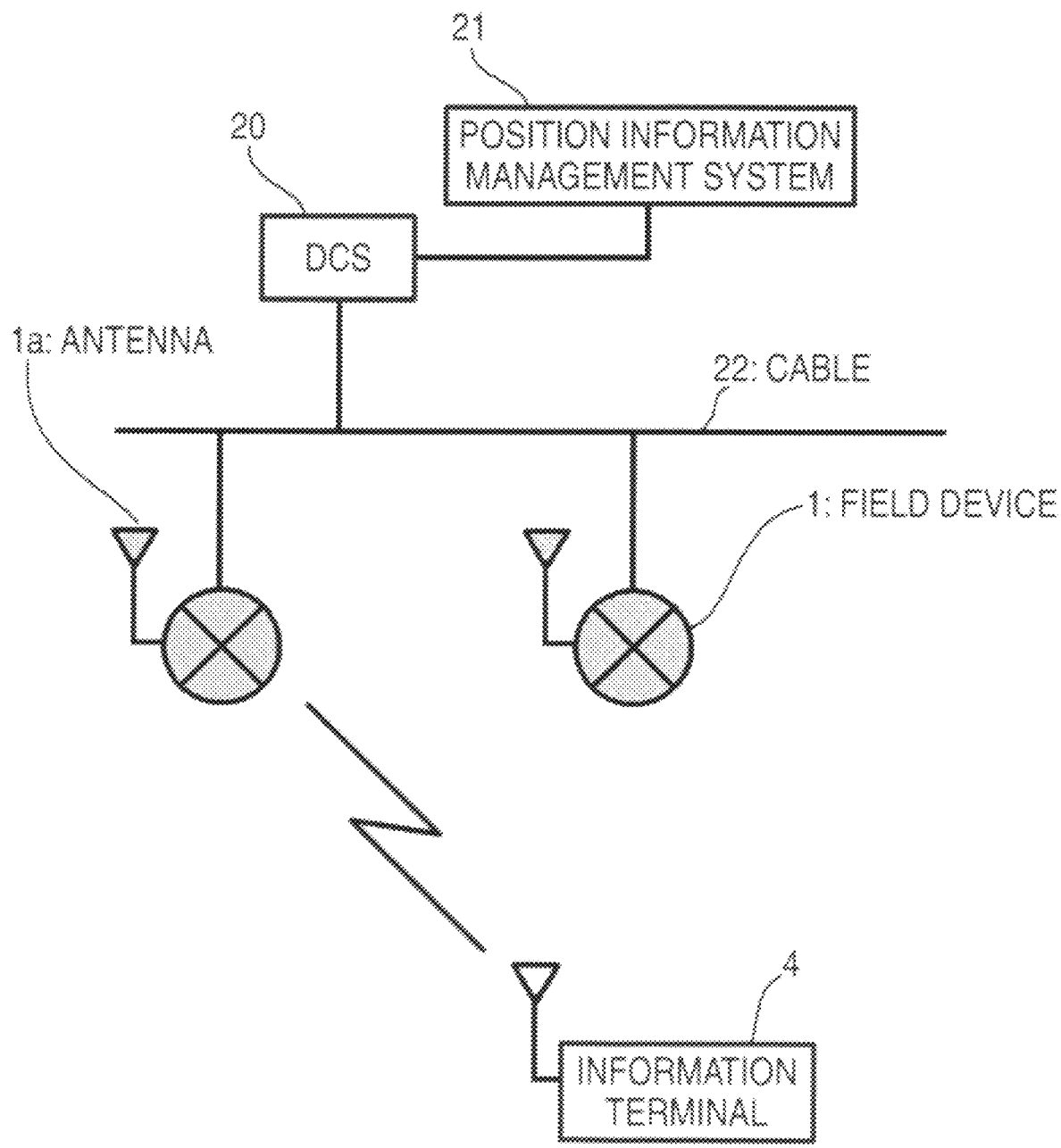
FIG. 4 shows another embodiment of the invention.

FIG. 1 is an explanatory drawing that shows an exemplary embodiment of an information terminal used in a field device search system according to the invention.

In FIG. 1, a numeral 4 represents an information terminal. A region indicated by A in the display screen 4a displays all field devices installed in a plant to receive maintenance. (While three devices are displayed in the figure, all devices are displayed while scrolling through the screen.) In FIG. 1, the third device from the top is a device to receive maintenance. By inputting for example a tag number from an input device such as a keyboard or a touch panel (not shown), the target device is highlighted to indicate that the device is one to be searched for.

A region indicated by B is one that displays the strength of radio waves from field devices. In the figure, an information terminal is positioned near a device displayed in the center. The strongest radio waves are received from this device.

A region indicated by C is a display area related to the use of a device. In this region also, all devices to receive maintenance may be displayed by way of scrolling.

A region indicated by D is a route display region that displays guidance of a route from the estimated position of the information terminal to the target device.

FIGS. 2(a) and 2(b) are block diagrams of an information terminal 4. In FIG. 2(a), a numeral 5 represents a radio wave receiver that communicates signals with the field device 1. A numeral 6 represents a display unit that presents a display screen 4a shown in FIG. 1. A numeral 7 represents a processor (CPU) for making various arithmetic operations such as calculation of a route to the device. A numeral 8 is a memory to which a program 9 and the position information 10 of the device. A numeral 11 represents an I/O for external connections.

FIG. 2(b) shows the details of the program 9 and includes description of a device position checker 12, a radio wave sensitivity checker 13, a position order logger 14, a route operator 15, a position guide viewer 16, and a radio wave sensitivity viewer 17.

FIG. 3 is a flowchart of the operation of the information terminal 4. The operation is described below in accordance with the flowchart.

In (a) of FIG. 3, radio waves from devices are received by the radio wave receiver 5.

In (b) of FIG. 3, the sensitivities of the received radio waves are checked by a radio wave sensitivity checker 13.

In (c) of FIG. 3, the position of the information terminal is identified with the device position checker 12 based on the information on the device from which radio waves are being received, radio wave sensitivity and the device position information 10.

In (d) of FIG. 3, the locus on which the information terminal has traveled is stored by the position order logger 14 and the direction the information terminal is traveling is calculated with the route operator 15 based on the stored locus.

In (e) of FIG. 3, based on the device position checker in the information terminal and the current location/direction obtained, the route to the device to be searched for is calculated by using the position order logger 14 and the route operator 15.

In (f) of FIG. 3, a list of radio wave sensitivities of devices from which radio waves are being received and route guidance to the target device are displayed on the display screen 4a in the information terminal with a position guide viewer 16 and a radio wave sensitivity viewer 17. As the worker advances in the plant in accordance with the display screen, the radio waves of a device to receive maintenance appear at the maximum level.

FIG. 4 shows an exemplary embodiment according to the forth aspect. In FIG. 4, a plurality of field devices 1 are connected to a distributed control system (DCS) 20 via cables 22. The DCS 20 is connected to a position information management system 21 at a higher level.

With the above configuration, by constantly transmitting an ID to a device from the information terminal 4 or a transmitter (arranged for example on a name plate or a sole), it is made possible to identify the position of the worker and monitor the work by way of the DCS based on an ID and the information on the position of a device arranged in the position information management system 21.

The above description covers only a specific preferable embodiment for the purpose of explaining and illustrating the invention. For example, the screen layout shown in FIG. 1 is not limited to the illustrated example but any other layout is possible.

The invention is not limited to the above embodiment and may be further modified without departing from the spirit and scope thereof.

[FIG. 1]
A: FIELD DEVICE TO RECEIVE MAINTENANCE
B: RADIO WAVE SENSITIVITY
C: DEVICE SPECIFICATIONS
D: GUIDES ALONG THE ROUTE FROM THE ESTIMATED POSITION TO THE TARGET DEVICE.
4: INFORMATION TERMINAL
4a: DISPLAY SCREEN
[FIG. 2(a)]
1: FIELD DEVICE
4: INFORMATION TERMINAL
5: RADIO WAVE RECEIVER
6: DISPLAY UNIT
7: PROCESSOR
8: MEMORY
9: PROGRAM
10: DEVICE POSITION INFORMATION
11: I/O
[FIG. 2(b)]
9: PROGRAM
12: DEVICE POSITION CHECKER
13: RADIO WAVE SENSITIVITY CHECKER
14: POSITION ORDER LOGGER
15: ROUTE OPERATOR
16: POSITION GUIDE VIEWER
17: RADIO WAVE SENSITIVITY VIEWER
[FIG. 3]
(a) RADIO WAVES FROM DEVICES ARE RECEIVED BY THE [RADIO WAVE RECEIVER].
(b) THE SENSITIVITIES OF THE RADIO WAVES ARE CHECKED BY A [RADIO WAVE SENSITIVITY CHECKER].
(c) THE POSITION OF THE INFORMATION TERMINAL IS IDENTIFIED WITH THE [DEVICE POSITION CHECKER] BASED ON THE INFORMATION ON THE DEVICE FROM WHICH RADIO WAVES ARE BEING

RECEIVED, RADIO WAVE SENSITIVITY AND THE [DEVICE POSITION INFORMATION] IN THE INFORMATION TERMINAL.
(d) THE LOCUS ON WHICH THE INFORMATION TERMINAL HAS TRAVELED IS STORED BY THE [POSITION ORDER LOGGER] AND THE DIRECTION THE INFORMATION TERMINAL IS TRAVELING IS CALCULATED WITH THE [ROUTE OPERATOR] BASED ON THE STORED LOCUS.
(e) BASED ON THE [DEVICE POSITION CHECKER] IN THE INFORMATION TERMINAL AND THE CURRENT LOCATION/DIRECTION OBTAINED, THE ROUTE TO THE DEVICE TO BE SEARCHED FOR IS CALCULATED BY USING THE [POSITION ORDER LOGGER] AND THE [ROUTE OPERATOR].
(f) A LIST OF RADIO WAVE SENSITIVITIES OF DEVICES FROM WHICH RADIO WAVES ARE BEING RECEIVED AND ROUTE GUIDANCE TO THE TARGET DEVICE ARE DISPLAYED ON THE [DISPLAY SCREEN] IN THE INFORMATION TERMINAL WITH A [POSITION GUIDE VIEWER] AND A [RADIO WAVE SENSITIVITY VIEWER.
[FIG. 4]
21: POSITION INFORMATION MANAGEMENT SYSTEM
1a: ANTENNA
22: CABLE
1: FIELD DEVICE
4: INFORMATION TERMINAL
[FIG. 5]
1: FIELD DEVICE
1a: ANTENNA
2: DRAWING
3: WORKER

What is claimed is:

1. A field device search system comprising: a plurality of field devices, installed in a plant, having a wireless transmitting/receiving capability, and an information terminal having a receiving capability to receive radio waves from the plurality of field devices, wherein the information terminal includes a radio wave receiver, a CPU, a display part, a memory, and a member for identifying one of the plurality of field devices, the memory comprising machine executable instructions stored in a computer readable medium, comprising, a device position checker that checks a position information of the information terminal; a radio wave sensitivity checker that checks a sensitivity of radio waves of the plurality of field devices; a position order logger that logs travel information of the information terminal; a route operator that determines a search route to one of the plurality of field devices; and a position guide viewer and a radio wave sensitivity viewer, wherein as an operator of the information terminal advances in the plant in accordance with the display part, the radio waves of the field device to receive maintenance appear at a maximum level.

2. The field device search system according to claim 1, wherein
the display part of the information terminal displays strength of radio waves received from the plurality of field devices and a detection result including at least a tag number of the device, estimates the position of the information terminal, and displays the search route from an estimated position to the one of the field devices to be searched for.

3. The field device search system according to claim 1, wherein
the memory stores program software operating on the information terminal and a list of information on the plurality of field devices installed in the plant.

4. The field device search system according to claim 1, wherein
the plurality of field devices are connected to a distributed control system via communication cables, and originate an ID signal from the information terminal or a transmitter held by a worker to the plurality of field devices.

5. A method of operating an information terminal, comprising: receiving radio waves of a field device from a plurality of field devices by a radio wave receiver; checking sensitivities of the received radio waves by a radio wave sensitivity checker; identifying a position of the information terminal with a device position checker based on information on the field device from which radio waves are being received, a radio wave sensitivity and a device position information; storing a locus on which the information terminal has traveled by a position order logger; calculating a direction the information terminal is traveling with a route operator based on the stored locus; calculating, based on the device position checker and the position and the direction, a route to the device to be searched for by using the position order logger and the route operator; and displaying a list of radio wave sensitivities of the field devices from which radio waves are being received and a route guidance to the target device on a display screen in the information terminal with a position guide viewer and a radio wave sensitivity viewer, wherein as an operator of the information terminal advances in a plant in accordance with the display screen, the radio waves of the field device to receive maintenance appear at a maximum level.

* * * * *